United States Patent
Truan et al.

(10) Patent No.: US 12,018,607 B2
(45) Date of Patent: Jun. 25, 2024

(54) AUTOMATIC DEF TANK FILLING SYSTEM

(71) Applicant: ZOETIC EQUIPMENT GROUP, Clawson, MI (US)

(72) Inventors: Brandon Truan, Bloomfield Township, MI (US); Timothy Hewitt, Bloomfield Township, MI (US)

(73) Assignee: ZOETIC EQUIPMENT GROUP, Clawson, MI (US)

( * ) Notice: Subject to any disclaimer, the term of this patent is extended or adjusted under 35 U.S.C. 154(b) by 0 days.

(21) Appl. No.: 17/737,623

(22) Filed: May 5, 2022

(65) Prior Publication Data
US 2022/0356827 A1  Nov. 10, 2022

Related U.S. Application Data

(60) Provisional application No. 63/184,782, filed on May 5, 2021.

(51) Int. Cl.
*F01N 3/20* (2006.01)

(52) U.S. Cl.
CPC .......... *F01N 3/208* (2013.01); *F01N 2610/02* (2013.01); *F01N 2610/142* (2013.01); *F01N 2610/144* (2013.01); *F01N 2610/148* (2013.01)

(58) Field of Classification Search
CPC ......... B67D 7/78; B67D 7/84; F01N 2610/02; F01N 2610/1406; F01N 2610/1413; F01N 2610/142; F01N 2610/144; F01N 2610/148; F01N 3/2066; F01N 3/208; Y02A 50/20; Y02T 10/12
See application file for complete search history.

(56) References Cited

U.S. PATENT DOCUMENTS

| | | | |
|---|---|---|---|
| 2008/0236685 A1 | 10/2008 | Nourdine et al. | |
| 2018/0339895 A1* | 11/2018 | Limbert | A47K 5/12 |
| 2021/0033017 A1 | 2/2021 | Fell et al. | |

FOREIGN PATENT DOCUMENTS

| | | |
|---|---|---|
| DE | 102008049150 | * 12/2009 |
| DE | 102012009884 | * 11/2013 |

* cited by examiner

*Primary Examiner* — Phutthiwat Wongwian
*Assistant Examiner* — Diem T Tran
(74) *Attorney, Agent, or Firm* — William H. Honaker; Dickinson Wright PLLC

(57) ABSTRACT

A fluid filling system for filling a tank from a source of fluid. The system is particularly beneficial for filling a DEF tank. The system has a pump connected to a fluid source, such as DEF. A fill hose has a proximal end and a distal end. The proximal end is connected to the pump. The distal end includes at least one first sensor mounted adjacent the distal end. The distal end is adapted for insertion into the tank. A CPU is operatively connected to the first sensor and the pump. The first sensor communicates with the CPU to energize the pump when the sensor fails to sense fluid when the fill hose is inserted into the tank. The CPU deenergizes the pump when the first sensor senses fluid when inserted into the tank. As a result, the fluid filling system continually fills the container through the fill hose.

11 Claims, 4 Drawing Sheets

AUTOMATIC DEF TANK FILLING SYSTEM

CROSS-REFERENCE TO RELATED APPLICATIONS

This application claims the benefit of U.S. Provisional Application No. 63/184,782 filed on May 5, 2021, which is incorporated herein by reference in its entirety.

TECHNICAL FIELD

This invention relates generally to tank filling systems and more particularly to an automatic DEF tank filling system.

BACKGROUND OF THE INVENTION

During the past few years, emission standards in commercial vehicles have been changing and getting more stringent. Since the Clean Air Act of 2010, diesel engine manufacturers have used Selective Catalytic Reduction (SCR) and Engine Gas Recirculation technology to help meet these legal requirements.

Selective Catalytic Reduction is used with an operating fluid called Diesel Exhaust Fluid (DEF), which is a synthetically made urea solution which has to meet an ISO standard. DEF is a safe to use fluid, which is filled into a separate DEF tank on the vehicle. DEF is a mixture of 67.5% deionized water and 32.5% urea.

The DEF tank must be manually filled. The DEF tank has circuitry that is integrated with the engine ECM. The ECM monitors the DEF supply to ensure that 32.5% urea to water is provided or the engine shuts down. To prevent engine shutdown, a continuous supply of DEF solution is required.

Diesel generators located on a site for operation over an extended period of time are tier 4 generators. These require DEF tanks. These generators have a separate large capacity diesel fuel tank to allow for long operation. For example, these tanks can contain enough fuel to allow the diesel generator to operate for up to a week or more. However, the DEF tank must be manually refilled much more often, for example every few days or even sooner.

These generators can consume an amount of DEF equal to 2% to 10% of the fuel burn. With a standard diesel fuel tank, most DEF tanks are required to be refilled every time or every other time the standard diesel tank is refueled. With the onsite generators, the fuel is consumed in much greater amounts than a standard tank requiring the DEF tank to be refilled several times over the period of use.

The DEF tank cannot be bypassed because of the circuitry in the DEF tank that is integrated with the engine ECM. That circuitry must detect the presence of the correct mixture of DEF solution or it will result in engine shut down.

Contaminants are another issue when refilling a DEF tank. They can have a negative effect on the chemical reaction of the catalyst in the SCR system (selective catalytic reduction). If contaminants reach the SCR system, it can require replacement of the SCR, which is very costly. Since on site generators are often used in harsh environments, the continual need to add DEF solution to the DEF tank increases the risk that contaminants will be introduced into the system.

What is needed is a refilling system that can automatically refill the DEF tank to allow the engine to continually operate and to reduce or even eliminate the introduction of contaminants into the SCR system. A further need is an automatic tank filling system that can be used to fill other types of tanks if needed.

SUMMARY OF THE INVENTION

In general terms, this invention provides a fluid filling system for filling a tank from a source of fluid. The system is particularly beneficial for filling a DEF tank. The system has a pump connected to a fluid source, such as DEF. A fill hose has a proximal end and a distal end. The proximal end is connected to the pump. The distal end includes at least one first sensor mounted adjacent the distal end. The distal end is adapted for insertion into the tank.

A CPU is operatively connected to the first sensor and the pump. The first sensor communicates with the CPU to energize the pump when the sensor fails to sense fluid when the fill hose is inserted into the tank. The CPU deenergizes the pump when the first sensor senses fluid when inserted into the tank. As a result, the fluid filling system continually fills the container through the fill hose.

The fluid filling system also includes a second sensor mounted to the fill hose to insure proper insertion of the fill hose into the tank to be filled. The CPU is operatively connected to the second sensor and the pump. The second sensor communicates with the CPU to energize the pump when the fill hose is in the tank. The CPU deenergizes the pump when the second sensor senses the fill hose is not in the tank. This ensures that the pump can only operate when the fill hose is in the tank.

The fluid filling system includes a siphon feature that empties the fill hose after the tank has been filled. It is important to empty the fill hose to avoid the crystallization or freezing of the fluid. As can be appreciated, diesel engines that need DEF can be in harsh environments where freezing can occur.

The siphon valve is connected to the pump and is operatively connected to the CPU. The CPU controls the siphon valve to empty the fill hose. The siphon valve includes a solenoid valve having an open position and closed position operatively connected to the CPU. The solenoid valve is normally in the closed position to connect the pump to the fluid source. The solenoid valve open position connecting the pump to atmosphere to pump air into the fill hose to empty the fill hose.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
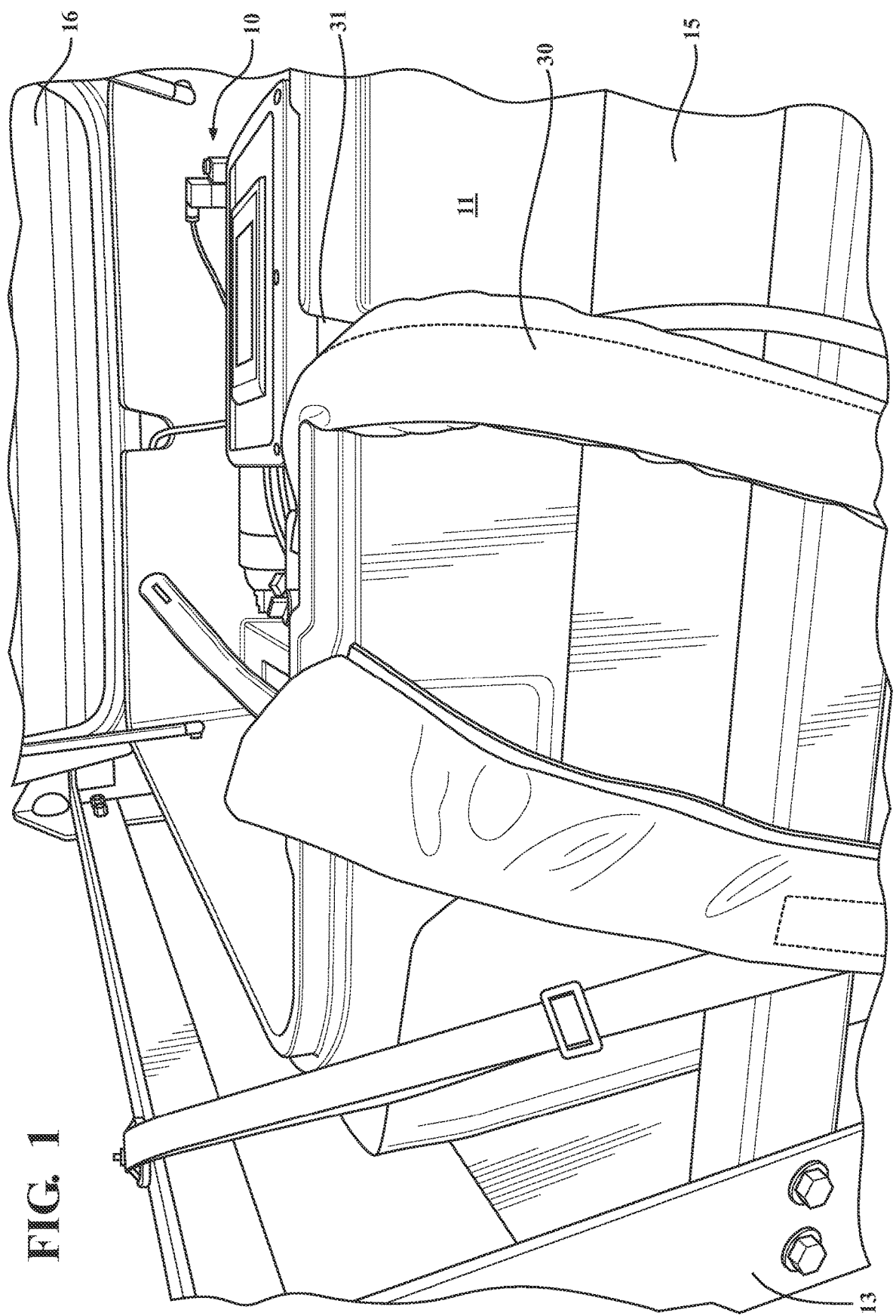
FIG. 1 is a partial perspective view of the automatic tank filling system of the present invention.
Figure 2:
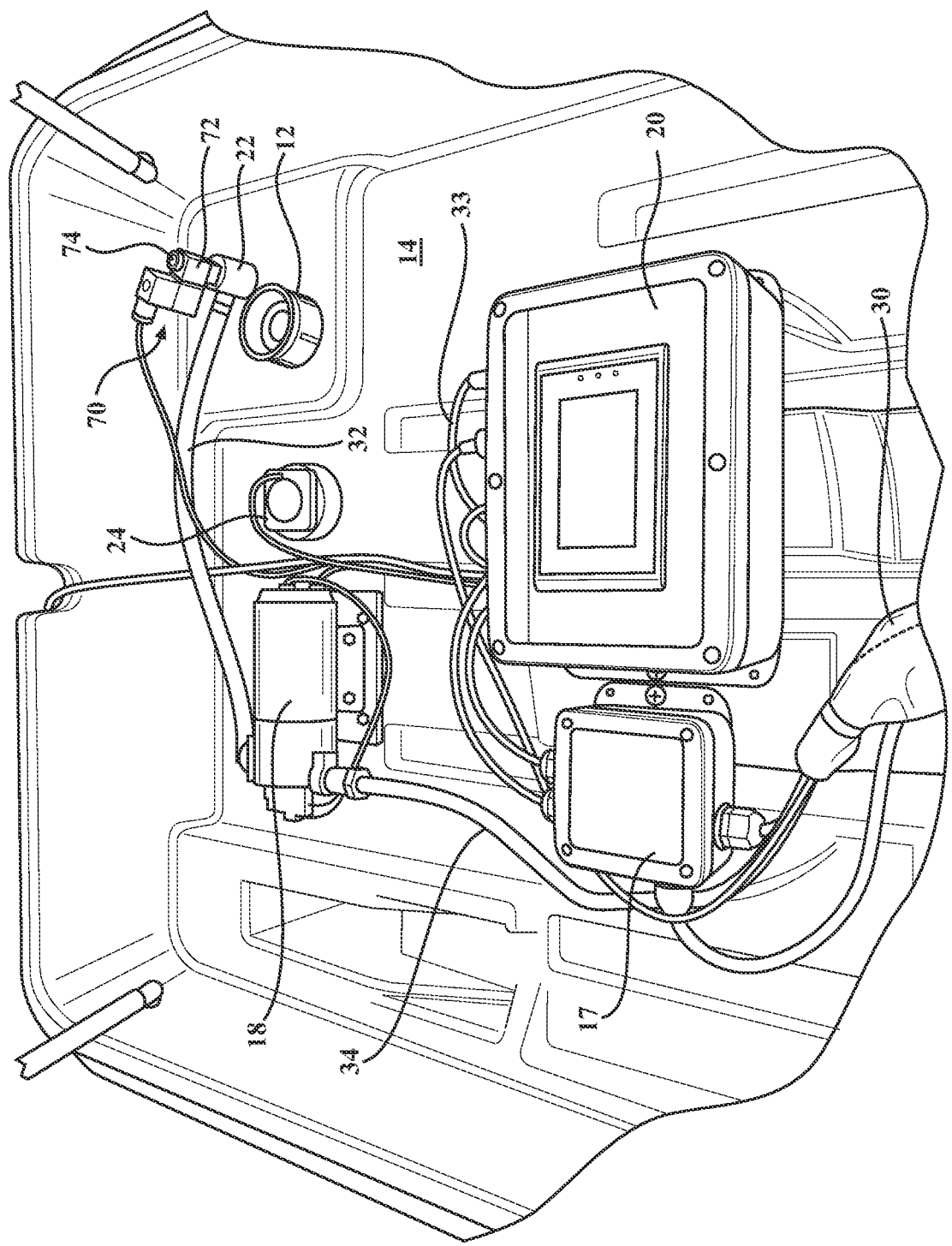
FIG. 2 is a top view of the compartment of the tank filling system.
Figure 3:
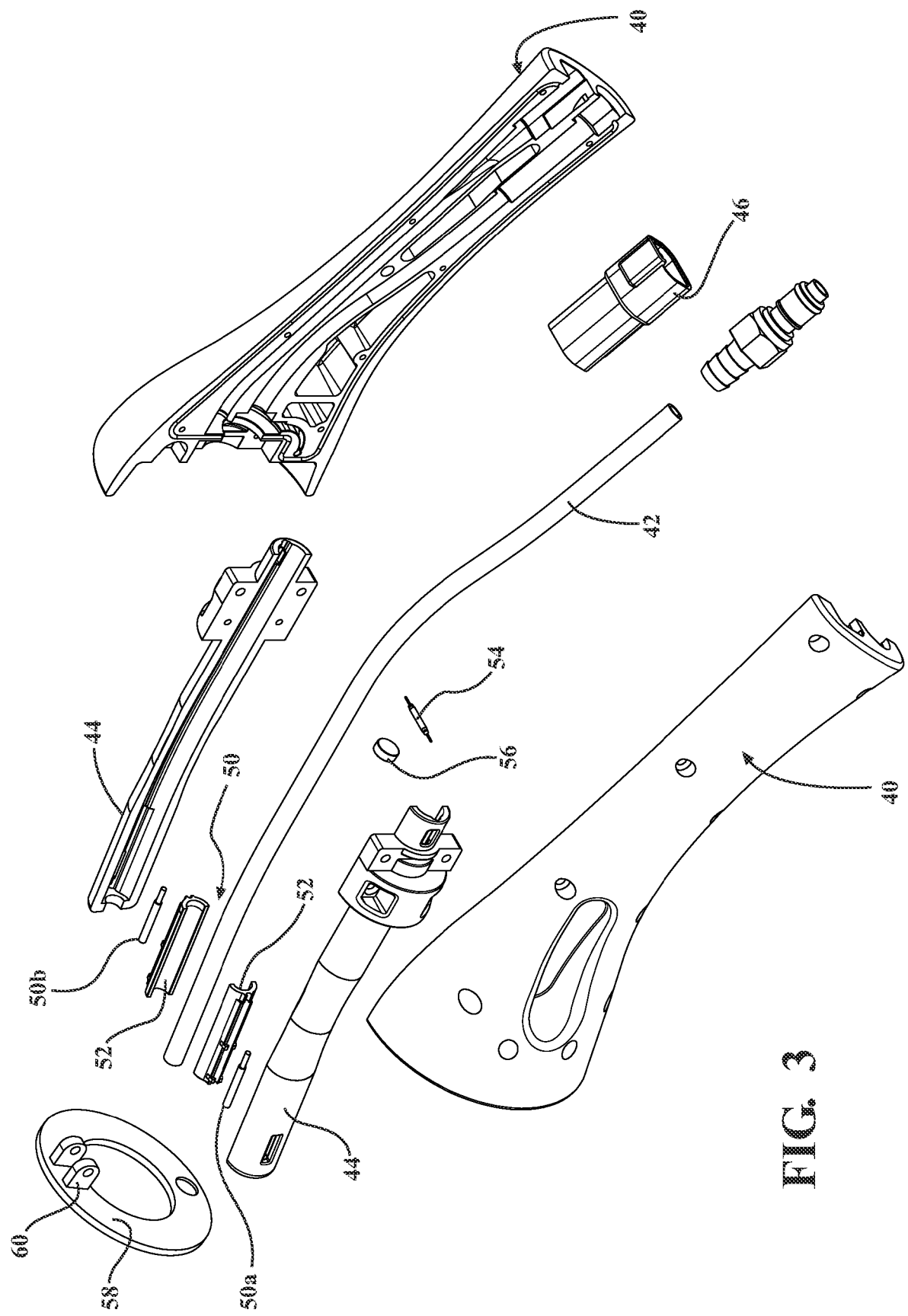
FIG. 3 is an exploded view of the fill hose.
Figure 4:
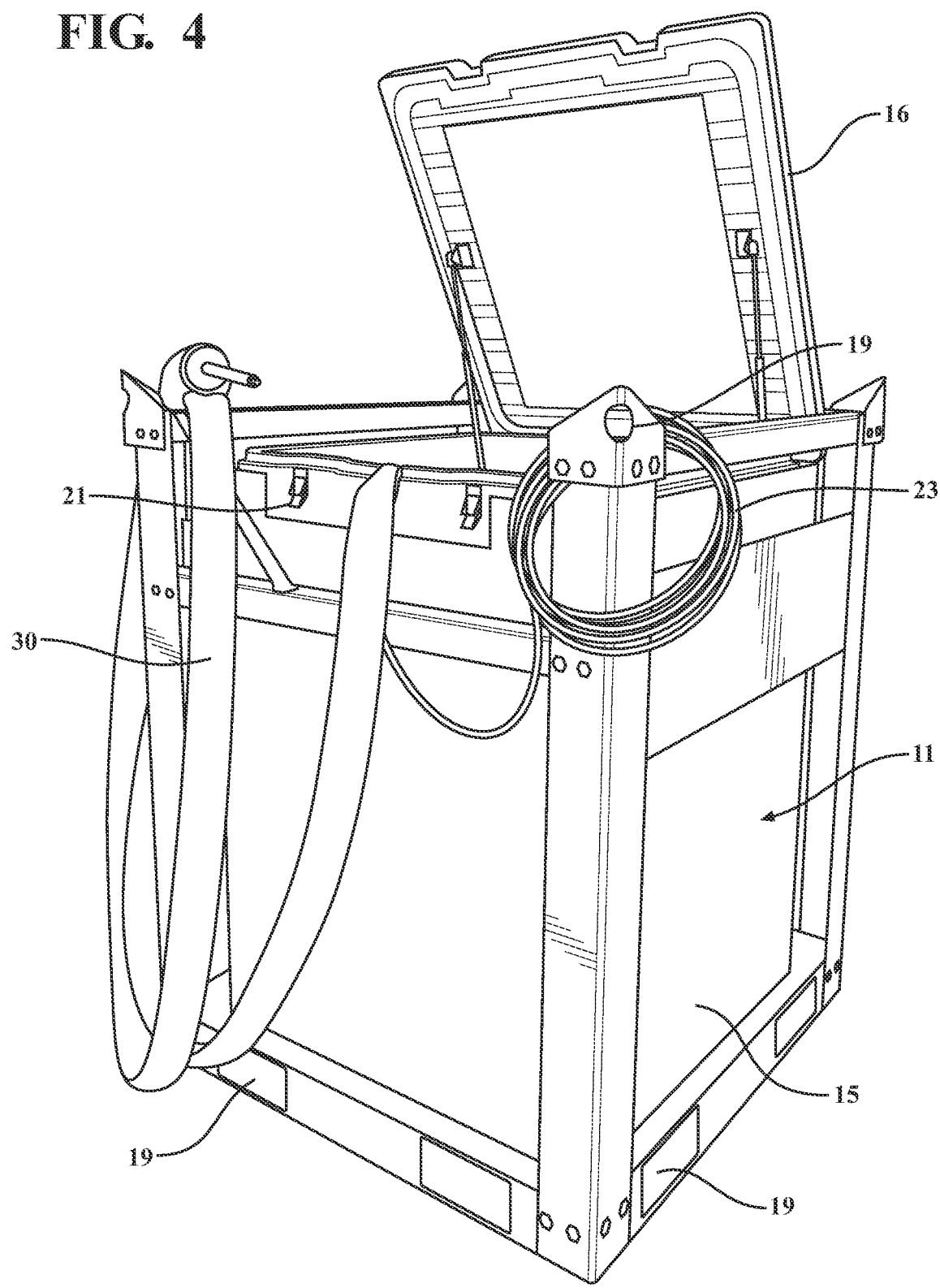
FIG. 4 is a perspective view of the automatic tank filling system of the present invention.

The present invention is shown in FIGS. 1 through 4. With reference to FIG. 4, a perspective view of the automatic tank filling system 10 of the present invention is shown. It is illustrated as a generally square shaped tank 11, but could be any desired shape, such as a cylinder with flat ends or rounded ends, or rectangular, etc. In the disclosed embodiment, the automatic tank filling system 10 contains DEF fluid for filing DEF tanks.

As illustrated, the automatic tank filling system 10 includes a fluid source tank 11 which is disclosed as being made of plastic and housed in a metal structure 13, which is shown as a frame. The illustrated metal structure 13 is galvanized steel, but could be any material, including fiberglass, reinforced fiberglass, steel, stainless steel, and wood for example. Additionally, instead of being a frame, the structure 13 could be a housing. The tank 11 could be made of other materials as well, such as fiberglass, reinforced fiberglass, steel, stainless steel, etc.

Additionally, the tank 11 can be insulated to avoid crystallization or freezing of the fluid in the tank 11. Even further, the refill tank 11 can be heated, by for example heating elements, or a heat wrap 15 etc. The switch and control are shown at 17.

An inlet 12 is provided for filling the DEF refill tank 11.

The disclosed automatic tank filling system 10 also includes transport handles and forklift openings 19 for easy transportation of the automatic tank filling system 10.

The illustrated DEF automatic tank filling system 10 includes a compartment 14, which is closed by a lid 16. The lid 16 can include a lock 21 to secure the lid 16 to the compartment 14 to control access. The compartment 14 houses the inlet 12, pump 18, control unit or CPU 20, tank outlet 22, tank level gauge 24, fill hose 30 and associated wiring 31 and lines. An external power cable 23 is provided for connecting the tank 10 to a power source. The fill hose 30 and power cable 23 exit the compartment 14 at the opening 31.

Pump 18 is mounted within the compartment 14. A fluid line 32 connects the fill tank outlet 22 to the pump 18 and a second fluid line 34 connects the opposite side of the pump 18 to the fill hose 30. CPU control unit 20 is mounted in the compartment 14 for controlling the pump 18 based upon operator inputted information and information received from sensors, which will be described below.

With reference to FIGS. 2 and 3, the fill hose 30 will be described. In the disclosed embodiment the fill hose 30 has a handle housing or nozzle 40 covering a fluid tube 42 connected to fluid line 34 connected to pump 18. The handle housing 40 houses fill tube 42, fill tube housing 44 and an electrical connector 46. The electrical connector 46 receives wiring from the sensors housed in the fill hose 30 and receives a mating connector for communicating with the CPU and the power source. The wiring has not been shown in the housing to assist in clarity of the illustration. One of ordinary skill in the art will understand the need for wiring and its attachment to the various sensors, etc. The fill tube housing 44 protects the fill tube 42.

First sensor 50 is mounted adjacent the distal end of the fill tube 42. The sensor 50 is mounted within holders 52, which are then mounted within the housing 44. In the disclosed embodiment, the sensor 50 detects the presence or absence of fluid. In the disclosed embodiment, the sensor 50 is a conductivity sensor. Sensor 50 includes two spaced sensors 50(a) and 50(b) that are electrically insulated from one another by the holders 52. When fluid engages the two spaced sensors of sensor 50, the sensors 50(a) and 50(b) are electrically conductive and signal the CPU 20 that there is fluid present. When fluid isn't present, the sensors 50(a) and 50(b) are non-conductive signaling that there is no fluid present.

A second sensor 54 is provided to sense the proper insertion of the handle or nozzle 40 of the fill hose 30 into the tank to be filled. In the disclosed embodiment, the sensor 54 is a reed switch, but other sensors could be used. The handle 40 can be used on any tank opening. The tank to be filled just needs to be open for receipt of the handle 40. The handle 40 is positioned over the opening, there is no need to have a mating screw cap for the various openings of DEF tanks. The housing 40 has a flapper or door 58 that includes a magnet 56. The flapper door is hinged at 60 to the housing 40. When the fill tube housing 44 is inserted onto a DEF tank opening, the flapper door 58 engages the opening and is hinged inwardly resulting in the magnet 56 engaging the reed switch of the second sensor 54. When the sensor 54 is closed it indicates that the handle 40 is properly inserted into the opening of the tank to be filled.

The sensor 54 is operatively connected to CPU 20. The CPU 20 receives the signal from the sensor 50 to control the pump 18. If the sensor 54 is open, corresponding to the fill hose 30 being absent or improperly positioned, the CPU 20 signals the pump 18 to not operate. When the sensor 54 is closed, corresponding to the fill hose 30 being properly positioned, the CPU 20 can operate the pump 18.

The automatic tank filling system 10 has a siphon 70. The siphon 70 empties the fill hose 30 after the tank is filled. It is important to empty the fill hose 30 to avoid crystallization or freezing of the fluid. As can be appreciated, diesel engines that need DEF can be in harsh environments where freezing can occur.

The siphon 70 is connected to the pump 18 and is operatively connected to the CPU 20. The CPU 20 controls the siphon 70 to empty the fill hose 30. The siphon 70 includes a solenoid valve 72 having an open position and closed position operatively connected to the CPU 20. The solenoid valve 72 is normally in the closed position to connect the pump 18 to the fluid source tank 11. The solenoid valve 72 in the open position connects the pump 18 to atmosphere to pump air into the fill hose 30 to empty the fill hose 30. The solenoid valve can include a screen 74.

A third sensor 24 communicates the fluid level in the fluid source tank 11 to the CPU 20.

The CPU 20 can have a wireless communication for remote CPU communication and operation, such as Bluetooth®. This allows one to control the CPU 20 and to obtain information from the automatic tank filling system 10, such as the fluid level in the fluid source tank 11.

In operation, the handle 40 is positioned on the DEF tank on for example a diesel-powered generator with a DEF tank. The flapper door 58 moves toward the second sensor 54. When the handle 40 is properly positioned on the tank opening, the magnet 56 on the door 58 closes the sensor 54. The closed sensor 54 communicates with the CPU 20 indicating that the handle 40 is properly positioned and that the pump 18 can be operated.

The first sensor 50 senses whether fluid is present in the DEF tank. If no fluid is sensed, the sensor 50 is non-conductive and the CPU energizes the pump 18. The pump 18 draws fluid from the fluid source tank 11 and pumps it through the fill hose 30 to fill the tank. When the level reaches the sensor 50, the fluid creates conductivity in the sensor 50 and signals the CPU to deenergize the pump 18. At this point the tank is full.

The CPU then initiates the purge cycle. The CPU waits for the sensor 50 to lose conductivity and then begins the purge step. This can be immediate or the CPU 20 can be programmed for a time delay to ensure that the tank has sufficient room for the fluid in the fill hose 30 to be emptied. The purge cycle involves the CPU signaling the solenoid valve 72 to open to atmosphere and energizes pump 18.

Pump 18 pulls air through the filter 74 and pumps it through the fill hose 30. The air forces the fluid in the fill hose 30 out of the fill hose 30 into the tank. The CPU 20 is programmed to operate the pump 18 for a period sufficiently long enough to empty the line 30 and then the solenoid valve 72 is closed. The CPU 20 then delays the pump 18 for a pre-programmed period. Once that period has expired, the pump is then reenergized to pump fluid from the source tank 11 into the DEF tank on the diesel engine.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A fluid filling system for filling a tank comprising:
   a source of fluid;
   a pump connected to said source of fluid;
   a fill hose having a proximal end and a distal end, said proximal end connected to said pump;
   at least one first sensor mounted adjacent said distal end, said distal end being adapted for insertion into the tank;
   a control unit (CPU) operatively connected to said at least one first sensor and said pump, said at least one first sensor communicating with said a control unit (CPU) to energize said pump when said at least one first sensor fails to sense fluid when said fill hose is inserted into the tank and said a control unit (CPU) deenergizes said pump when said at least one first sensor senses fluid when inserted into the tank;
   a second sensor mounted to said fill hose, said a control unit (CPU) operatively connected to said second sensor and said pump, said second sensor communicating with said a control unit (CPU) to energize said pump when said fill hose is in the tank, said a control unit (CPU) deenergizes said pump when said second sensor senses the fill hose is not in the tank;
   said second sensor includes a flap pivotally mounted to said fill hose, said second sensor is a reed switch, whereby said flap is adapted to engage the tank and pivot to engage said reed switch, which when engaged senses said fill hose is in the tank and communicates to said a control unit (CPU) that said pump can operate;
   whereby said fluid filling system continually fills the tank through said fill hose.

2. The fluid filling system of claim 1, wherein said flap includes a magnet to operate said reed switch.

3. The fluid filling system of claim 1, further including a siphon valve connected to said pump, said siphon valve is operatively connected to said a control unit (CPU), said a control unit (CPU) controls said siphon valve to empty said fill hose.

4. The fluid filling system of claim 3, wherein said siphon valve includes a solenoid valve having an open position and closed position operatively connected to said a control unit (CPU), said solenoid valve is normally in said closed position to connect said pump to said fluid source, said solenoid valve open position connecting said pump to atmosphere to pump air into said fill hose to empty said fill hose.

5. The fluid filling system of claim 1, further including a third sensor to sense the level of fluid in said fluid source.

6. The fluid filling system of claim 1, wherein said a control unit (CPU) includes wireless communication for remote a control unit (CPU) communication and operation.

7. A Diesel exhaust fluid (DEF) tank filling system for continually filling a DEF tank comprising:
   a source of DEF fluid;
   a pump connected to said source of DEF fluid;
   a fill hose having a proximal end and a distal end, said proximal end connected to said pump and at least one first sensor mounted adjacent said distal end, said distal end being adapted for insertion into the DEF tank;
   a CPU operatively connected to said at least one first sensor and said pump, said at least one first sensor communicating with said CPU to energize said pump when said at least one first sensor fails to sense fluid when said fill hose is inserted into the DEF tank and said CPU deenergizes said pump when said at least one first sensor senses fluid when inserted into the DEF tank;
   a siphon valve connected to said pump, said siphon valve is operatively connected to said CPU, said CPU controls said siphon valve to empty said fill hose after the tank is full;
   a second sensor mounted to said fill hose, said CPU operatively connected to said second sensor and said pump, said second sensor communicating with said CPU to energize said pump when said fill hose is in the tank, said CPU deenergizes said pump when said second sensor senses the fill hose is not in the tank;
   said second sensor includes a flap pivotally mounted to said fill hose, said second sensor is a reed switch, whereby said flap is adapted to engage the tank and pivot to engage said reed switch, which when engaged senses said fill hose is in the tank and communicates to said CPU that said pump can operate;
   whereby said DEF fluid filling system continually fills the DEF tank through said fill hose.

8. The fluid filling system of claim 7, wherein said flap includes a magnet to operate said reed switch.

9. The fluid filling system of claim 7, wherein said CPU includes wireless communication for remote CPU communication and operation.

10. The fluid filling system of claim 7, wherein said siphon valve includes a solenoid valve having an open position and closed position operatively connected to said CPU, said solenoid valve is normally in said closed position to connect said pump to said fluid source, said solenoid valve open position connecting said pump to atmosphere to pump air into said fill hose to empty said fill hose.

11. The fluid filling system of claim 7, further including a third sensor to sense the level of fluid in said fluid source.

* * * * *